(12) United States Patent
Wu et al.

(10) Patent No.: US 12,347,174 B2
(45) Date of Patent: Jul. 1, 2025

(54) INFORMATION PROCESSING APPARATUS AND INFORMATION PROCESSING METHOD FOR OBJECT RECOGNITION LEARNING

(71) Applicant: SONY GROUP CORPORATION, Tokyo (JP)

(72) Inventors: Jianing Wu, Tokyo (JP); Jun Yokono, Tokyo (JP); Sayaka Watanabe, Tokyo (JP); Natsuko Ozaki, Tokyo (JP); Yoshiaki Iwai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 289 days.

(21) Appl. No.: 17/759,182

(22) PCT Filed: Jan. 25, 2021

(86) PCT No.: PCT/JP2021/002431
§ 371 (c)(1),
(2) Date: Jul. 20, 2022

(87) PCT Pub. No.: WO2021/153501
PCT Pub. Date: Aug. 5, 2021

(65) Prior Publication Data
US 2023/0073513 A1 Mar. 9, 2023

(30) Foreign Application Priority Data
Jan. 28, 2020 (JP) .................... 2020-011505

(51) Int. Cl.
*G06V 10/776* (2022.01)
*G06V 20/56* (2022.01)

(52) U.S. Cl.
CPC ............ *G06V 10/776* (2022.01); *G06V 20/56* (2022.01)

(58) Field of Classification Search
CPC .... G06V 10/776; G06V 20/56; G06V 10/235; G06V 10/764; G06V 10/7788;
(Continued)

(56) References Cited

U.S. PATENT DOCUMENTS

| 2003/0144764 A1* | 7/2003 | Yokono ................. G06N 3/008 700/245 |
| 2013/0202212 A1* | 8/2013 | Wu ....................... G06V 10/772 382/201 |

(Continued)

FOREIGN PATENT DOCUMENTS

| CA | 2995556 A | 12/2017 |
| CN | 103295011 A | 9/2013 |

(Continued)

OTHER PUBLICATIONS

International Search Report and Written Opinion of PCT Application No. PCT/JP2021/002431, issued on Mar. 16, 2021, 09 pages of ISRWO.

*Primary Examiner* — Iriana Cruz
(74) *Attorney, Agent, or Firm* — CHIP LAW GROUP

(57) ABSTRACT

An information processing apparatus executes a recognition learning process of an object in the first image captured by a camera, detects from the first image an object region in which the object is present, extracts feature amounts of feature points associated with the object region, creates an object model based on the extracted feature amounts, discriminates the object in the first image based on the object model, assesses a progress status of the recognition learning process of a target region of the object based on a discrimination result, generates an image signal in which a second image that represents the target region and the progress status is superimposed on the first image captured by the
(Continued)

camera, and outputs the image signal to a display device to present the target region and the progress status to the user.

14 Claims, 11 Drawing Sheets

(58) Field of Classification Search
CPC ........ G06V 20/20; G06V 20/64; G06V 40/20; G06N 3/008
See application file for complete search history.

(56) References Cited

U.S. PATENT DOCUMENTS

| | | |
|---|---|---|
| 2013/0345870 A1* | 12/2013 | Buehler ............. G06V 30/1914 901/47 |
| 2014/0316636 A1* | 10/2014 | Hong ................... G05D 1/0274 901/1 |
| 2018/0169865 A1* | 6/2018 | Kou ........................ G06N 3/008 |
| 2019/0102377 A1* | 4/2019 | Neuman .............. G05D 1/2285 |
| 2021/0240984 A1 | 8/2021 | Nishio |
| 2022/0237898 A1* | 7/2022 | Uehara ................ G06V 10/776 |

FOREIGN PATENT DOCUMENTS

| | | |
|---|---|---|
| EP | 3466505 A1 | 4/2019 |
| JP | 2013-161391 A | 8/2013 |
| JP | 2017-182114 A | 10/2017 |
| JP | 2017-213112 A | 12/2017 |
| WO | WO-2019216016 A1 | 11/2019 |

* cited by examiner

INFORMATION PROCESSING APPARATUS AND INFORMATION PROCESSING METHOD FOR OBJECT RECOGNITION LEARNING

CROSS REFERENCE TO RELATED APPLICATIONS

This application is a U.S. National Phase of International Patent Application No. PCT/JP2021/002431 filed on Jan. 25, 2021, which claims priority benefit of Japanese Patent Application No. JP 2020-011505 filed in the Japan Patent Office on Jan. 28, 2020. Each of the above-referenced applications is hereby incorporated herein by reference in its entirety.

TECHNICAL FIELD

The present technology relates to an information processing apparatus, an information processing method, and a program that are associated with object recognition learning.

BACKGROUND ART

Patent Literature 1 has disclosed an information processing apparatus includes a display control unit that controls the display of a progress bar indicating a progress status of learning processing, a progress rate indicating a percentage of completed learning processing to the whole learning processing, and an addition button for dynamically adding an additional arithmetic operation node. In the information processing apparatus, the user can intuitively add the additional arithmetic operation node in a case where the learning progress is slower than the user expected, for example.

On the other hand, in recent years, robots that assist the lives of humanity as their partners are being developed. Such a robot includes a pet robot or the like that imitates the body mechanism of a four-legged animal such as a dog and a cat and its movement.

CITATION LIST

Patent Literature

Patent Literature 1: Japanese Patent Application Laid-open No. 2017-182114

DISCLOSURE OF INVENTION

Technical Problem

As to the object recognition learning of the robot, the user sometimes wishes to know the learning progress status of the robot.

In view of the above-mentioned circumstances, it is an objective of the present technology to provide an information processing apparatus, an information processing method, and a program that are capable of presenting a learning status of object recognition learning to a user in an understandable manner.

Solution to Problem

In order to accomplish the above-mentioned objective, an information processing apparatus according to an embodiment of the present technology includes a learning unit, an assessment unit, and a signal generation unit.

The learning unit performs recognition learning of an object in an image captured by a camera.

The assessment unit assesses a progress status of the recognition learning of a target region of the object.

The signal generation unit generates a presentation signal for presenting the target region and the progress status to a user.

With such a configuration, since the target region and the progress status of the object recognition learning are presented to the user, the user can know the learning status of the information processing apparatus.

In order to accomplish the above-mentioned objective, an information processing method according to an embodiment of the present technology includes:

performing recognition learning of an object in an image captured by a camera;

assessing a progress status of recognition learning of a target region of the object; and generating a presentation signal for presenting the target region and the progress status to a user.

In order to accomplish the above-mentioned objective, a program according to an embodiment of the present technology causes an information processing apparatus to execute:

a step of performing recognition learning of an object in an image captured by a camera;

a step of assessing a progress status of recognition learning of a target region of the object; and a step of generating a presentation signal for presenting the target region and the progress status to a user.

MODE(S) FOR CARRYING OUT THE INVENTION

Hereinafter, learning status presentation of object recognition learning according to each of embodiments of the present technology will be described with reference to the drawings.

In the following embodiments, object recognition learning by an autonomous mobile robot as a mobile object will be described as an example. Examples of the autonomous mobile robot can include a pet robot and a humanoid robot that assist the lives of humanity as their partners and mainly serve to communicate with the humanity. Here, a four-legged dog-type pet robot (hereinafter, referred to as robot) will be described as an example as the autonomous mobile robot, though not limited thereto. Alternatively, the object recognition learning may be performed by an information processing apparatus other than the robot.

[Schematic Configuration of Information Processing System]

In the present technology, an object recognition learning status of the robot is configured to be capable of being presented to a user.

Figure 1:
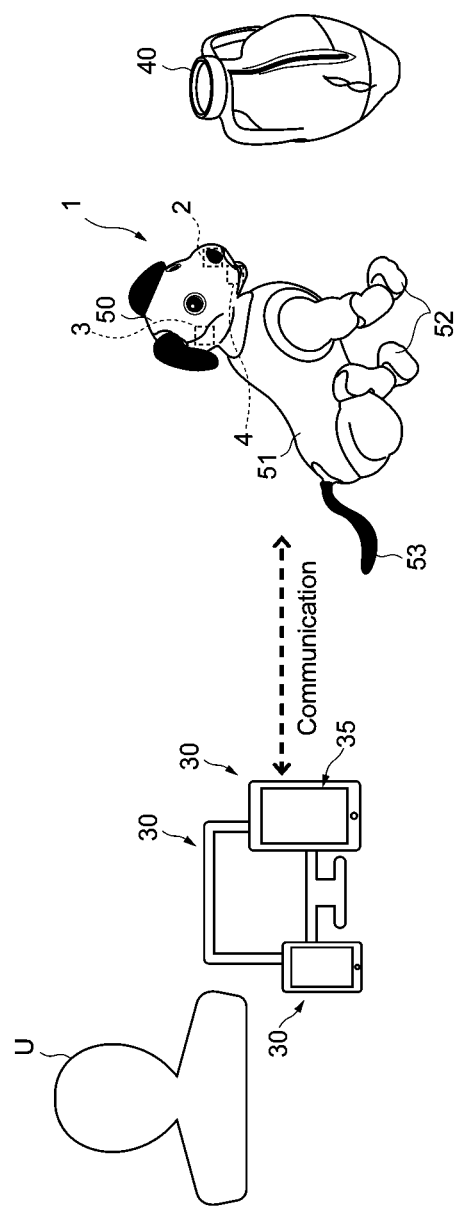
FIG. 1 A diagram showing the overview of an information processing system according to an embodiment of the present technology.

As in the information processing system shown in FIG. 1, user terminals 30 owned by a user U and a robot 1 are configured to be capable of communicating with each other wirelessly or with a wire. In FIG. 1, a pot 40 is a target object of the object recognition learning. The robot 1 as an information processing apparatus is capable of presenting an object recognition learning status of the pot 40 to the user U by displaying an image on a display unit 32 of a touch panel 35 of the user terminal 30. Otherwise, the robot 1 is capable of presenting the object recognition learning status of the pot 40 by using position and attitude of the robot 1, audio information such as barking of the robot 1, or the like.

The robot 1 includes a head portion 50, a body portion unit 51, leg portion units (corresponding to four legs) 52 that is a mobile unit, and a tail portion unit 53. Actuators 5 to be described later are respectively installed in articulated portions of the leg portion units (corresponding to four legs) 52, coupling portions between the leg portion units 52 and the body portion unit 51, a coupling portion between the head portion 50 and the body portion unit 51, a coupling portion between the tail portion unit 53 and the body portion unit 51, and the like. The leg portion units 52 can function as object holding portions for holding an object.

Moreover, various sensors such as a camera 2, a motion sensor (not shown), and a microphone 3 are mounted on the robot 1 in order to acquire data associated with surrounding environment information. In addition, a loudspeaker 4 is mounted on the robot 1. The camera 2, the microphone 3, and the loudspeaker 4 are mounted on the head portion 50. Provided that the head side of the robot 1 is front and the tail portion side of the robot 1 is back, the camera 2 mainly acquires information regarding the front of the robot 1. The robot 1 may include a rearward camera that acquires information regarding the back of the robot 1.

[Configuration of User Terminal]

Figure 2:
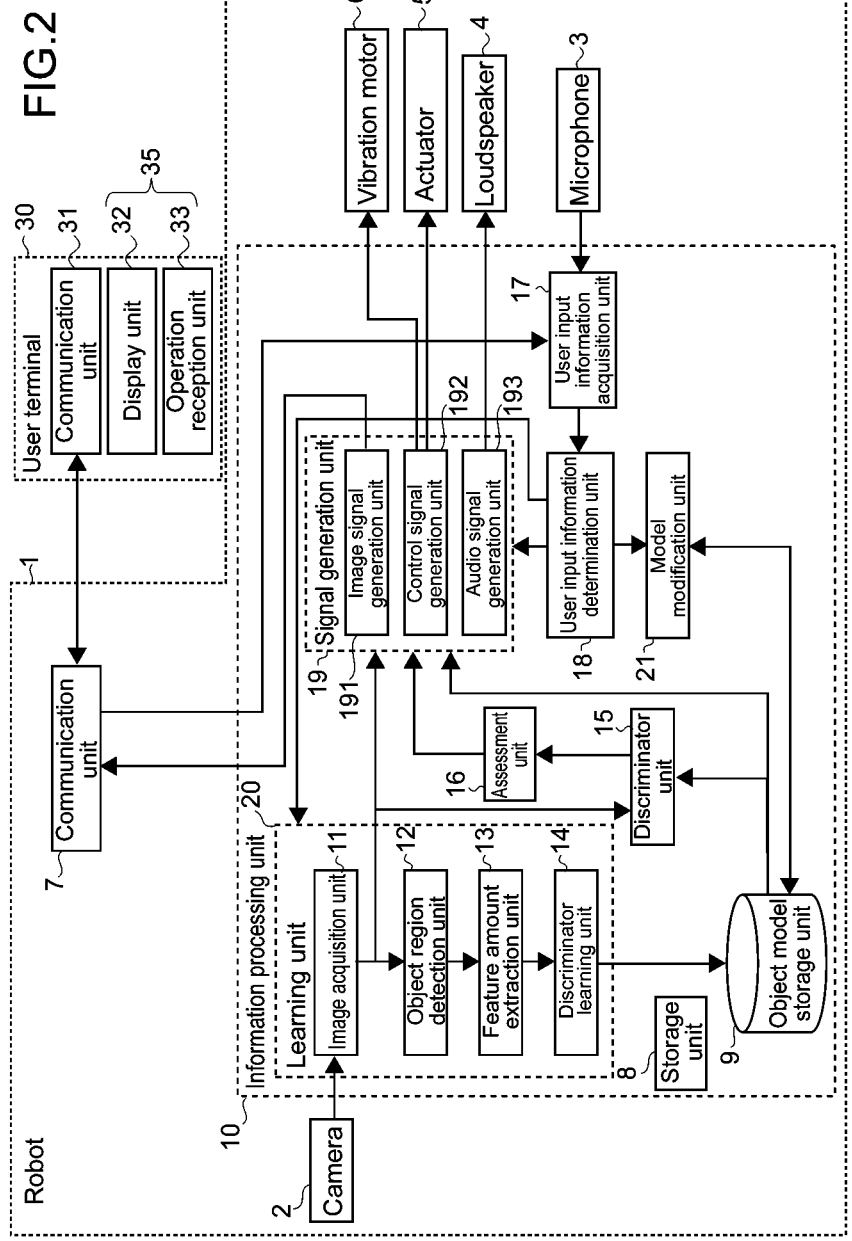
FIG. 2 A block diagram showing configurations and functions of a robot and a user terminal according to the embodiment.

FIG. 2 is a block diagram showing configurations and functions of the user terminal 30 and the robot 1.

The user terminal 30 is a mobile device such as a mobile phone and a tablet, a personal computer (PC), a laptop PC, or the like. The user terminal 30 is configured to be capable of communicating with the robot 1 and includes a display unit that performs display by using an image signal sent from the robot 1.

As shown in FIG. 2, the user terminal 30 has a communication unit 31, the display unit 32, and an operation reception unit 33.

The communication unit 31 communicates with an external device including the robot 1 and sends and receives various signals. The communication unit 31 receives an image signal from the robot 1. The communication unit 31 sends to the robot 1 user input information that is information regarding user input made by the user U through the operation reception unit 33 in the user terminal 30.

The user terminal 30 in this embodiment includes the touch panel 35. The touch panel 35 is constituted by a display device having the display unit 32 and a transparent touch pad that covers the surface of the display device and serves as the operation reception unit 33. The display device is constituted by a liquid-crystal panel, an organic EL panel, or the like, and displays an image on the display unit 32.

An image based on an image signal received from an external device including the robot 1 via the communication unit 31 can be displayed on the display unit 32.

The operation reception unit (touch pad) 33 has a function of detecting a position that the user taps with the finger(s). The operation reception unit 33 receives an input operation from the user. The operation reception unit 33 is not limited to the touch pad, and may be a keyboard, a mouse, and the like. It is sufficient that the operation reception unit 33 is configured to be capable of detecting a position specified by the user in an image displayed on the display unit 32.

An application that gives a function of making the object recognition learning status of the robot 1 visible as an image and a function of sending to the robot 1 information input by the user is installed in the user terminal 30 (hereinafter, simply referred to as application). In this embodiment, when the application is activated and a button for input operation displayed on the display unit 32 is tapped, an input operation is performed. The user input information input by the user is sent to the robot 1 via the communication unit 31.

[Configuration of Robot (Information Processing Apparatus)]

As shown in FIG. 2, the robot 1 includes the camera 2, the microphone 3, the loudspeaker 4, the actuators 5, a vibration motor 6, a communication unit 7, and an information processing unit 10.

As described above, the actuators 5 are provided in the coupling portions between the articulated portions and the unit. The actuators 5 are driven to control the position and attitude of the robot 1 and the movement of the robot 1.

The camera 2 is mounted on a nose portion of the head portion 50. Hereinafter, the description will be given assuming that the camera 2 that acquires information regarding the front of the robot 1 images an object to be learned. The actuators 5 are driven to control the movement of the robot 1, to thereby change the position and attitude of the camera 2. That is, the drive control of the actuators 5 indirectly controls the position and attitude of the camera 2, and it can be said that drive control signals for the actuators 5 are drive control signals for controlling the position and attitude of the camera 2.

The microphone 3 collects surrounding sounds of the robot 1.

The loudspeaker 4 emits sounds.

The vibration motor 6 is mounted on, for example, the body portion unit 51 of the robot 1. The vibration motor 6 generates vibration.

The communication unit 7 communicates with an external device including the user terminal 30. The communication unit 7 sends an image signal to the user terminal 30. The communication unit 7 receives the user input information from the user terminal 30.

The information processing unit 10 includes a storage unit 8, an object model storage unit 9, a learning unit 20, a discriminator unit 15, an assessment unit 16, a user input information acquisition unit 17, a user input information determination unit 18, a signal generation unit 19, and a model modification unit 21.

The storage unit 8 includes a memory device such as a RAM and a nonvolatile recording medium such as a hard disk drive. The storage unit 8 stores a program that causes the robot 1 that is the information processing apparatus to execute processing of generating a presentation signal for presenting the object recognition learning status and various types of processing performed on the basis of the user input information.

The processing in the information processing unit 10 is executed in accordance with the program stored in the storage unit 8.

The program stored in the storage unit 8 is for causing the robot 1 that is the information processing apparatus to execute a step of performing recognition learning of an object in an image captured by the camera 2, a step of assessing a progress status of the recognition learning of the object, and a step of generating a signal for presenting a target region and the progress status of the object recognition learning to the user (hereinafter, sometimes referred to as presentation signal).

The object model storage unit 9 stores an object model that is data for recognizing the object. The object model storage unit 9 is configured to be capable of reading and writing data. The object model storage unit 9 stores an object model learned and generated by the learning unit 20. The object model has object shape information, such as a three-dimensional point cloud, and learning state information. The learning state information includes images that have contributed to learning, degrees of contribution, distributions in a feature space, spreads, overlaps of object models learned in the past, the position and attitude of the camera at the time of learning, and the like.

The learning unit 20 performs learning processing by using an object recognition algorithm.

The learning unit 20 has an image acquisition unit 11, an object region detection unit 12, a feature amount extraction unit 13, and a discriminator learning unit 14.

The image acquisition unit 11 acquires an image captured by the camera 2. Hereinafter, the image captured by the camera 2 will be referred to as a base image in some cases.

The object region detection unit 12 detects from an image acquired by the image acquisition unit 11 an object region in which the object is estimated to be present. This detection is performed by edge detection, background subtraction processing matching, and the like.

The feature amount extraction unit 13 extracts feature amounts of feature points detected from the detected object region. The feature points are detected by searching for a pixel pattern corresponding to feature portions such as corner portions of the object, for example. A well-known technique can be used as a technique of extracting the feature amounts. For example, pixel information corresponding to the feature points can be extracted as the feature amounts.

The discriminator learning unit 14 builds an object model by using the extracted feature amount information. The built object model is stored in the object model storage unit 9.

The discriminator unit 15 discriminates an object in the image acquired by the image acquisition unit 11 by using the object model stored in the object model storage unit 9.

In the discriminator unit 15, the object in the image acquired by the camera 2 and the object model stored in the object model storage unit 9 are compared with each other and a score based on a degree of similarity is calculated. Scores of 0 to 1 are defined for the score.

The information obtained by the discriminator unit 15 performing discrimination processing on the input image input from the camera 2 includes model parts that have contributed to the discrimination, model parts that have adversely affected the discrimination, information obtained by collecting the statistics of states at the time of discriminating parts of the input image, and the like. Hereinafter, the information obtained by the discriminator unit 15 performing the discrimination processing on the input image will be referred to as discrimination trial result information in some cases. The discrimination trial result information is a discrimination result.

The assessment unit 16 assesses a learning status by using the discrimination trial result information. The learning status includes information regarding a target region of the object recognition learning (hereinafter, sometimes referred to as learning target region) and information regarding a progress status of the object recognition learning in the learning target region (hereinafter, sometimes referred to as learning progress status).

Here, an example in which the learning progress status is assessed with two values as to whether or not the learning has been performed will be described.

For example, an object region estimated to be an object region by the object region detection unit 12 at the time of learning processing is a region that is a learning target, and therefore the object region detected by the object region detection unit 12 may be assessed as a learned region and a region not detected as the object region may be assessed as an unlearned region.

Alternatively, whether or not the learning has been performed may be assessed by using a score calculated by the discriminator unit 15. For example, a region whose score is larger than 0.5 is assessed as the learned region and a region whose score is equal to or smaller than 0.5 is assessed as the unlearned region.

The user input information acquisition unit 17 serving as an input information acquisition unit acquires the user input information sent from the user terminal 30 via the communication unit 7. Moreover, in a case where an input operation based on the voice of the user U is performed, the user input information acquisition unit 17 acquires audio information of the user U collected by the microphone 3 as the user input information. The user input information as the input information includes processing type information such as "learning start", "additional learning", and "remove", region information of a target on which the processing is performed, and the like.

The user input information determination unit 18 determines the user input information acquired by the user input information acquisition unit 17.

Functions of the user input information determination unit 18 in a case of a user input from the touch panel 35 will be described.

Activation of the application enables an image captured by the camera 2 of the robot 1 to be displayed on the display unit 32 of the user terminal 30 and enables input buttons for input operations from the user associated with learning such as "learning start", "additional learning", and "remove" to be displayed on the display unit 32 of the user terminal 30.

An input operation from the user is performed by tapping one of the input buttons such as "learning start", "additional learning", and "remove" displayed on the display unit 32 of the touch panel 35 of the user terminal 30. The user input information determination unit 18 determines which one, "learning start", "additional learning", or "remove" the input user input information is. It should be noted that in a case where the input is "additional learning" or "remove", a region to be additionally learned or removed is specified by an input operation through the touch panel 24 before the input through such a button. Here, "remove" means removing from the object model a region that has been learned by the robot 1 but does not need to be learned and may be ignored. A specific image display example in the user terminal 30 will be described later.

In the specification of the region to be additionally learned or removed using the touch panel 35, a predetermined region having the position tapped with the finger as the center may be set as the region to be additionally learned or removed. Alternatively, in a case where a depth sensor is mounted on the robot 1 so that object segmentation can be performed, a segment including the tapped position may be set as the region to be additionally learned or removed.

In addition, the user input information determination unit 18 determines whether or not to change the position and attitude of the camera 2 in a case of "additional learning". In a case of changing the position and attitude of the camera 2, the user input information determination unit 18 calculates position and attitude information of the camera 2.

In a case where the user input information determination unit 18 determines that the input user input information is "learning start", the user input information determination unit 18 sends to the learning unit 20 instruction information of the learning start. The learning unit 20 performs the learning processing on the basis of the instruction of the learning start.

In a case where the user input information determination unit 18 determines that the input user input information is "additional learning" and the position and attitude of the camera 2 should be changed, the user input information determination unit 18 sends to the learning unit 20 region information of additional learning specified by the user U and sends to the signal generation unit 19 the calculated position and attitude information of the camera 2.

A control signal generation unit 191 of the signal generation unit 19 generates drive control signals for the actuators 5 on the basis of the position and attitude information of the camera 2. The actuators 5 are driven on the basis of the generated drive control signals to thereby change the position and attitude of the robot 1, thus the position and attitude of the camera 2.

The learning unit 20 performs the learning processing on the basis of the instruction of additional learning. The learning unit 20 extracts the feature amount of the specified region to be additionally learned in an image captured by the camera 2 that has changed in the position and attitude and rebuilds the object model by using the feature amount. The rebuilt object model is stored in the object model storage unit 9.

In a case where the user input information determination unit 18 determines that the input user input information is "additional learning" and the position and attitude of the camera 2 should not be changed, the user input information determination unit 18 sends to the learning unit 20 region information of additional learning specified by the user U.

The learning unit 20 extracts the feature amount of the specified region to be additionally learned on the basis of the instruction of additional learning and rebuilds the object model by using the feature amount. The rebuilt object model is stored in the object model storage unit 9.

In a case where the user input information determination unit 18 determines that the input user input information is "remove", the user input information determination unit 18 sends to the model modification unit 21 information regarding a region to be removed, which has been specified by the user U. The model modification 21 will be described later.

Functions of the user input information determination unit 18 in a case of a user input based on the voice of the user will be described.

The user input information determination unit 18 determines whether the user input information is the instruction of the learning start or the instruction of the movement of the robot 1 on the basis of audio information of the user collected by the microphone 3 and acquired by the user input information acquisition unit 17. A specific example of the user's voice input operation will be described later.

The user input information determination unit 18 determines whether or not the user has uttered a keyword that is a trigger to start learning on the basis of the audio information of the user U. In a case where the user input information determination unit 18 determines that the user has uttered, the user input information determination unit 18 sends the instruction information of the learning start to the learning unit 201. The learning unit 20 performs the learning processing on the basis of the instruction of additional learning.

The words "learning start", "learning", and "memorize", for example, can be used for the keyword. Those keywords are set and stored in advance.

The user input information determination unit 18 determines whether or not the user has uttered the keyword to instruct the robot 1 to move on the basis of the audio information acquired by the user input information acquisition unit 17. In a case where the user input information determination unit 18 determines that the user has uttered, the user input information determination unit 18 calculates position and attitude information of the robot 1 so that the robot moves in accordance with the instruction indicated by the keyword. The user input information determination unit 18 sends the calculated position and attitude information of the robot 1 to the signal generation unit 19. The control signal generation unit 192 of the signal generation unit 19 generates drive control signals for the actuators 5 on the basis of the position and attitude information of the robot 1. The actuators 5 are driven on the basis of the generated drive control signals to thereby change the position and attitude of the robot 1, thus the position and attitude of the camera 2.

As the keywords, for example, words that are combinations of words indicating the directions, e.g., "right", "left", "up", and "down" with words indicating the types of operations, e.g., "move", "turn", and "look" can be used. The keywords are set and stored in advance. Drive control signals are generated on the basis of the instruction indicated by the keyword in which the direction and the type of operation are combined.

For example, it is assumed that the user U instructs the robot 1, which is on the learning mode after learning is started, to "turn left". The user input information determination unit 18 calculates movement information for changing the position and attitude so that the robot 1 turns left around the object to be learned and faces the object in accordance with the type of the instruction of this user.

Based on the learning status assessed by the assessment unit 16, the signal generation unit 19 generates a presentation signal for presenting the learning status to the user.

The presentation method for the learning status includes image display by the user terminal 30, behavior display by the robot 1, audio display by the robot 1, and the like.

The signal generation unit 19 has an image signal generation unit 191, a control signal generation unit 192, and an audio signal generation unit 193.

FIGS. 3A, 3B, and 3C are examples of an image displayed on the display unit 32 of the user terminal 30 at the time of learning of the robot 1. FIG. 3A shows an image displayed when the application is activated. FIG. 3B shows an image in which the learning status is presented. FIG. 3C shows an image in which the learning status after the learning is performed on the basis of additional learning and removal instructions made by the user viewing the image shown in FIG. 3B is presented. In the example shown in FIGS. 3A, 3B, and 3C, the target of the object recognition learning of the robot 1 is the pot 40.

The image signal generation unit 191 generates an image signal to be displayed on the display unit 32 of the user terminal 30. The image signal can be a presentation signal for presenting the learning status. By the application activated in the user terminal 30, a base image acquired by the camera 2 of the robot 1, which has been generated by the image signal generation unit 191, and an image visualizing the learning status of the robot 1 are displayed on the display unit 32 of the user terminal 30 as shown in FIGS. 3A, 3B, and 3C. Moreover, the input buttons and the like are displayed on the display unit 32.

The image signal generation unit 191 generates an image to be superimposed on the basis of the assessment result of the assessment unit 16. In this embodiment, the image signal generation unit 191 generates a display image in which the image to be superimposed for representing the learning status is superimposed on the base image. The image signal to be generated can be the presentation signal for presenting the learning status.

In the example shown in FIG. 3B, a display image in which images to be superimposed of rectangular tiles 60 are superimposed on a base image showing the pot 40 is displayed. The display of the tiles 60 shows the learning target region and also shows the learning progress status in which the region is being learned. The region in which the tile 60 is not displayed indicates that it is not the learning target region but the unlearned region. It should be noted that the size and shape of the tile 60 are not limited.

The tile 60 representing the learning status is generated on the basis of the assessment result of the assessment unit 16.

In this manner, the image display can present the learning status to the user. The user can intuitively know the learning status of the robot 1 by viewing the image displayed on the display unit 32.

The control signal generation unit 192 generates drive control signals for controlling driving of the actuators 5 of the robot 1. The drive control signals can be the presentation signal for presenting the learning status.

The actuators 5 are driven on the basis of the generated drive control signals, to thereby control the position and attitude of the robot 1, and thus the position and attitude of the camera 2. Where the learning target region is is presented to the user as the orientation of the head portion 50 of the robot 1, on which the camera 2 is mounted, with respect to the object that is the target of the object recognition learning. That is, the part of the object to be learned, which directly faces the head portion 50, is the learning target region.

In this manner, the learning target region that is included in the learning status can be presented to the user by the position and attitude of the robot 1. The user can intuitively know the region that the robot 1 considers as the learning target by viewing the position and attitude of the robot 1.

The control signal generation unit 192 generates drive control signals for the actuators 5 for moving the robot 1 to the position suitable for image acquisition of the region to be additionally learned on the basis of the information regarding the region to be additionally learned, which has been sent from the user input information determination unit 18.

The control signal generation unit 192 generates drive control signals for the actuators 5 on the basis of the position and attitude information of the robot 1, which has been sent from the user input information determination unit 18.

The control signal generation unit 192 may generate drive control signals on the basis of the assessment result of the assessment unit 16. For example, drive control signals for the actuators 5 may be generated to wag the tail in a case where the learning has not been performed yet and not to wag the tail in a case where the learning has already been performed.

In this manner, the position and attitude of the robot 1 may be controlled and the learning progress status that is included in the learning status may be presented to the user by the behavior display of the robot 1. The user can intuitively know the learning progress status of the robot 1 by viewing the behavior of the robot 1.

Alternatively, the control signal generation unit 192 may generate a drive control signal for controlling the vibration of the vibration motor 6 on the basis of the assessment result of the assessment unit 16. For example, drive control signal for the vibration motor 6 may be generated to cause vibration in a case where the learning has not been performed yet and not to cause vibration in a case where the learning has already been performed.

In this manner, the learning progress status that is included in the learning status may be presented to the user by the behavior display of the robot 1, which is indicated by the vibration. The user can intuitively know the learning progress status of the robot 1 by viewing the behavior of the robot 1.

The audio signal generation unit 193 generates an audio signal. The loudspeaker 4 emits a sound on the basis of the generated audio signal. The audio signal can be the presentation signal for presenting the learning status. Here, an example in which a sound imitating a bark is emitted as the sound will be described.

The audio signal generation unit 193 may generate an audio signal on the basis of the assessment result of the assessment unit 16. For example, the audio signal generation unit 193 can generate an audio signal to bark in a case where the learning has not been performed yet and not to bark in a case where the learning has already been performed.

In this manner, the learning progress status that is included in the learning status can be presented to the user by the audio display. The user can intuitively know the learning progress status of the robot 1 by hearing the sound emitted from the robot 1.

The model modification unit 21 modifies the object model stored in the object model storage unit 9 on the basis of the information regarding the region to be removed, which has been specified by the user U and received from the user input information determination unit 18. The modified object model is stored in the object model storage unit 9.

Hereinafter, a specific example of presentation of the object recognition learning status using the robot 1 will be described. In first, third to fifth embodiments below, an example in which the learning status of the robot 1 is presented to the display unit 32 of the user terminal 30 by the image will be described. In a second embodiment, an example in which the learning status of the robot 1 is presented to the display unit 32 of the user terminal 30 by the position and attitude of the robot 1 and the sound emitted from the robot 1 will be described.

First Embodiment

A specific example of presentation by the image display of the learning status will be described with reference to FIGS. 3A, 3B, 3C, and 4.

Figure 4:
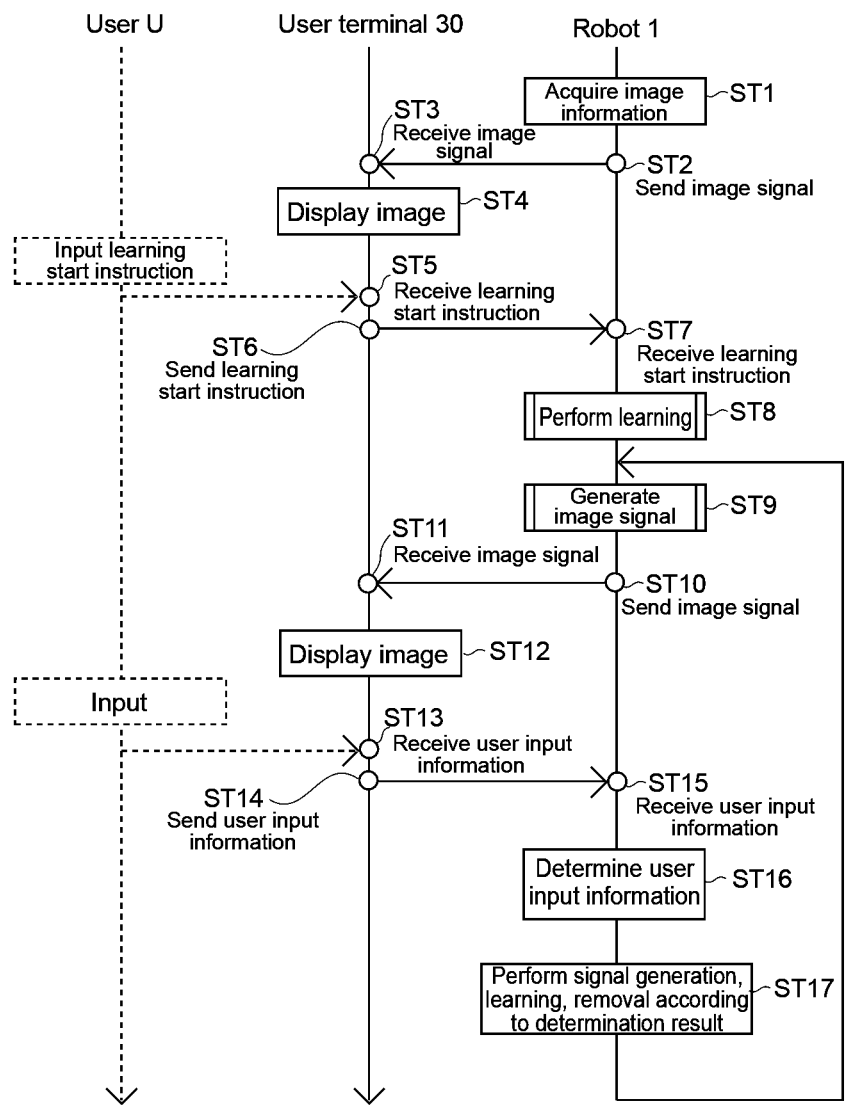
FIG. 4 A time flowchart showing a flow associated with learning status presentation in the first embodiment.

FIG. 4 is a time flowchart showing a flow of a series of processing associated with presentation of the learning status by the image display of the robot 1. The dotted-line portion in FIG. 4 indicates an operation performed by the user U of the user terminal 30 and the solid-line portion in the figure indicates processing performed by the user terminal 30 and the robot 1.

Hereinafter, following the flow of FIG. 4, an information processing method associated with the presentation by the image display of the learning status and the additional learning and removal based on the user instruction will be described with reference to FIGS. 3A, 3B, and 3C.

It is assumed that the camera 2 of the robot 1 is constantly active and can acquire images.

As shown in FIG. 4, the robot 1 acquires information regarding the image captured by the camera 2 through the image acquisition unit 11 (ST1). When the user U activates the application through the user terminal 30, the robot 1 sends to the user terminal 30 an image signal (image information) acquired by the image acquisition unit 11 (ST2).

Figure 3:
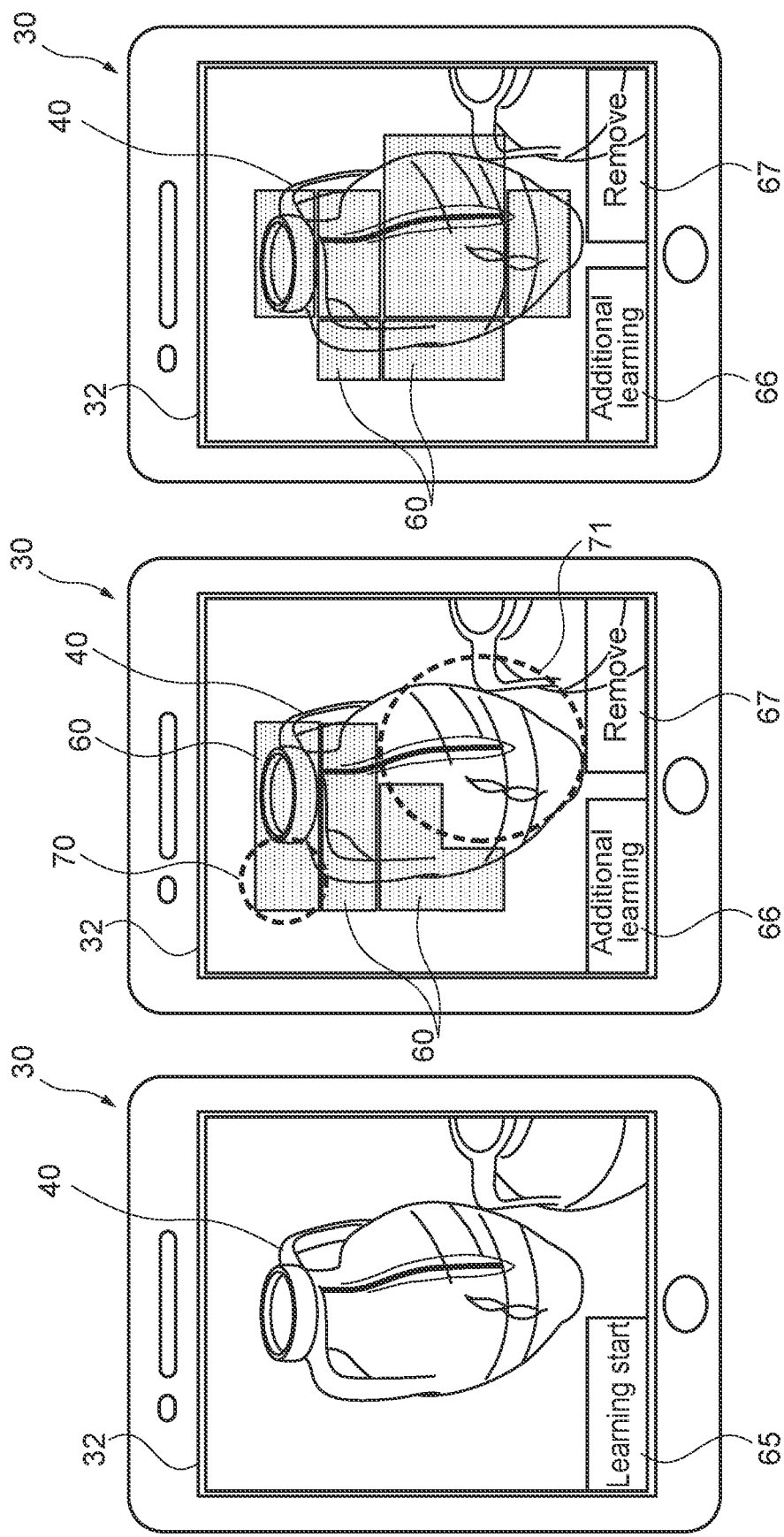
FIGS. 3A, 3B, and 3C The diagrams for describing learning status presentation examples by image display according to a first embodiment, which are image examples displayed on the user terminal.

The user terminal 30 receives the image signal (ST3). The user terminal 30 displays an image on the display unit 32 by using the received image signal (ST4). On the display unit 32, for example, as shown in FIG. 3 A, an image in which the input button 65 for learning start is superimposed on the base image captured by the camera 2 of the robot 1 is displayed.

By the user U tapping the input button 65 for learning start displayed on the display unit 32 of the touch panel 35, the user terminal 30 receives a learning start instruction (ST5).

When the user terminal 30 receives the learning start instruction, the user terminal 30 sends the learning start instruction to the robot 1 (ST6).

When the robot 1 receives the learning start instruction (ST7), the robot 1 starts the object recognition learning of the pot 40 through the learning unit 20 (ST8). The learning processing will be described later.

Next, the robot 1 generates an image signal for presenting the learning status through the image signal generation unit 191 (ST9). The image signal is an image in which an image to be superimposed that indicates the learning status is superimposed on the base image. The image signal generation processing will be described later.

The robot 1 sends the generated image signal to the user terminal 30 (ST10).

The user terminal 30 receives the image signal (ST11) and displays the image on the display unit 32 by using the image signal (ST12).

As shown in FIG. 3B, the image signal received by the user terminal 30 is an image in which the tiles 60 that are images to be superimposed that indicate the learning statuses are superimposed on the base image showing the pot 40 that is the learning target. The learning status includes learning target region information and a learning progress status. Here, an example in which the learning progress status is displayed with two values as to whether or not the learning has been performed. That is, the positions where the tiles 60 are arranged indicate the learning target region information and the display/non-display of the tiles 60 indicates the learning progress status. In addition, as shown in FIG. 3B, an input button 66 for additional learning and an input button 67 for removal are superimposed on the image based on the received image signal and displayed on the display unit 32.

As shown in FIG. 3B, the learning status is visualized and presented to the user by the display of the tiles 60.

In FIG. 3B, the region where the tiles 60 are displayed is the unlearned region of the robot 1. For example, the vicinity of a region surrounded with a broken-line circle 71 positioned in the lower part of the pot 40 is the unlearned region in the object recognition learning of the pot 40. This unlearned region is, for example, a region of the pot 40 but it is a region that has not been estimated to be the object region by the object region detection unit 12.

On the other hand, the vicinity of the region surrounded with a broken-line circle 70, which is not the region of the pot 40 but it has been learned by the robot 1, is not the region of the pot 40 but it is a region that has been estimated to be the object region by the object region detection unit 12. The vicinity of the region surrounded with the circle 70 is a region that should be ignored in recognizing the pot 40 as the object and is a region to be removed in the object model.

By the user U tapping an arbitrary part on the touch panel 35, a predetermined region having the tapped position as the center, for example, is an additional-learning or removal target region.

By the user U tapping the input button 66 for additional learning or the input button 67 for removal after the user U specifies the region to be additionally learned or removed by tapping it, the user terminal 30 receives the user input information (S13). The user input information is, in other words, feed-back information from the user.

In the example shown in FIG. 3B, by the user U tapping an arbitrary part in the region surrounded with the circle 71 and further tapping the input button 66 for additional learning, the instruction of additional learning and its region information are received as the user input information.

Moreover, by the user U tapping an arbitrary part in the region surrounded with the circle 70 and further tapping the input button 67 for removal, the removal instruction and its region information are received as the user input information. It should be noted that even through it is a region where the learning has already been performed, in a case where it is assessed that it is a region wished by the user U to additionally learn in a focused manner, that region can be set as an additional-learning target region by tapping the region and tapping the input button 66 for additional learning.

In this manner, the user U can specify an insufficiently learned region, a region wished to be learned in a focused manner, or a region to be removed by an input operation through the touch panel 35 by viewing the learning status presented by the image display.

When the user terminal 30 receives the user input information, the user input information sends the user input information to the robot 1 (ST14).

The robot 1 acquires the user input information via the communication unit 7 from the user input information acquisition unit 17 (ST15).

Next, the robot 1 determines the user input information through the user input information determination unit 18 (ST16). Specifically, the user input information determination unit 18 determines whether the user input information is for additional learning or removal. In a case where the user input information determination unit 18 determines that the user input information is for additional learning, the user input information determination unit 18 determines whether or not to change the position and attitude of the camera 2 on the basis of the information regarding the region to be additionally learned. In a case where the user input information determination unit 18 determines to change the position and attitude of the camera 2, the user input information determination unit 18 calculates position and attitude information of the camera 2 that is suitable for image acquisition of the specified region to be additionally learned. For example, in a case where the robot 1 includes the depth sensor, the position and attitude information of the camera 2 may be calculated by using distance information between the recognition target object and the robot 1 in addition to the image information acquired by the camera 2.

Next, the robot 1 performs generation of various signals, learning, modification of the object model, or the like in accordance with the determination result of the user input information determination unit 18 (S17).

Signal generation and learning in S17 in a case where it is determined in S16 that the user input information is for additional learning and it is determined to change the position and attitude of the camera 2 will be described.

In this case, the position and attitude information of the camera 2 calculated by the user input information determination unit 18 is sent to the signal generation unit 19. The control signal generation unit 192 of the signal generation unit 19 generates drive control signals for the actuators 5 on the basis of the received position and attitude information of the camera 2.

In the robot 1, the actuators 5 are driven on the basis of the generated drive control signals to thereby change the position and attitude of the camera 2. After that, learning processing similar to that in ST8 is performed. Specifically, the learning unit 20 performs learning by using the image acquired by the camera 2 that has changed in the position and attitude. The learning unit 20 performs feature amount extraction and discriminator learning in the region to be additionally learned, which has been specified for additional learning, and rebuilds the object model. The rebuilt object model is stored in the object model storage unit 9.

Learning in S17 in a case where it is determined in S16 that the user input information is for additional learning and it is determined not to change the position and attitude of the camera 2 will be described.

In this case, the information regarding the region to be additionally learned is sent to the learning unit 20. The learning unit 20 performs learning in the region specified as the region to be additionally learned. Specifically, the learning unit 20 performs feature amount extraction and discriminator learning in the region specified as the region to be additionally learned and rebuilds the object model. The rebuilt object model is stored in the object model storage unit 9.

Removal in S17 in a case where it is determined in S16 that the user input information is for removal of the region will be described.

In this case, the information regarding the region to be removed is sent to the model modification unit 21. The model modification unit 21 removes the specified region and modifies the object model. The modified object model is stored in the object model storage unit 9.

Next, returning to ST9, the robot 1 generates the display image displayed on the display unit 32 of the user terminal 30. In the example shown in FIGS. 3A, 3B, and 3C, the image signal is generated on the basis of the additional learning and removal instructions. That is, since the robot 1 removes the region of the circle 70 shown in FIG. 3B from the learning target region and additionally learns the region of the circle 71, the robot 1 generates an image in which the tiles 60 are superimposed to cover substantially the entire pot 40 as shown in FIG. 3C and the display of the tiles 60 in the region corresponding to the circle 70 is removed. In this manner, an image on which the result of additional learning or the like based on the feed-back information from the user U is reflected and a change in the learning status is revisualized is presented to the user U. The user can perform a feed-back such as additional learning and removal again by viewing the image in which the change in the learning status is revisualized. The object model can be optimized by repeatedly performing a feed-back from the user U to which the learning status is presented and additional learning or the like according to the feed-back.

It should be noted that in a case where it takes a long time to perform the learning processing in ST8, information indicating that the learning is being performed may be presented to the user by the image display. In this case, the processing after ST9 may be performed at the time at which the learning is completed.

The learning processing of the learning unit 20 in ST8 described above will be described following the flow of FIG. 5.

Figure 5:
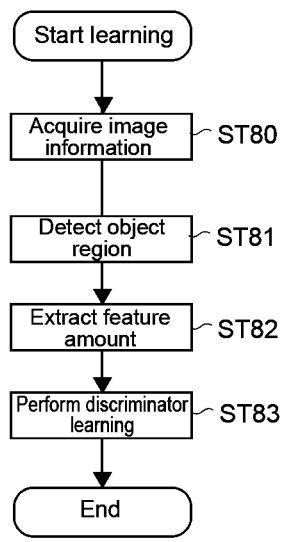
FIG. 5 A flowchart of learning processing.

As shown in FIG. 5, the image acquisition unit 11 acquires an image captured by the camera 2 (ST80).

Next, the object region detection unit 12 detects, from the image acquired by the image acquisition unit 11, an object region where an object is estimated to be present (ST81).

Next, the feature amount extraction unit 13 extracts feature amounts of feature points detected from the detected object region (ST82).

Next, the image signal generation processing of the image signal generation unit 191 in ST9 described above will be described following the flow of FIG. 6.

Figure 6:
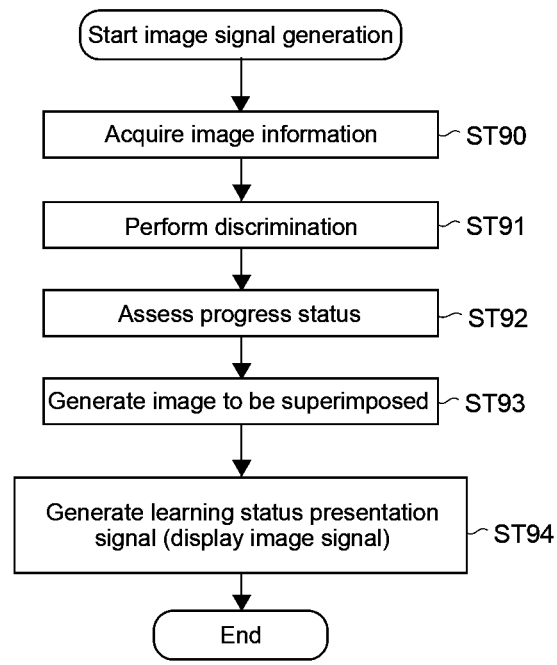
FIG. 6 A flowchart of image signal generation processing.

As shown in FIG. 6, the image acquisition unit 11 acquires an image captured by the camera 2 (ST90).

Next, the discriminator unit 15 discriminates an object in the acquired image by using the object model stored in the object model storage unit 9 (ST91).

Next, the assessment unit 16 assesses an object recognition learning status on the basis of the discrimination result of the discriminator unit 15 (ST92). The assessment unit 16 assesses a learning target region and a learning progress status of the region as the learning status. Here, the learning progress status is assessed with two values as to whether or not the learning has been performed.

Next, the image signal generation unit 191 generates an image to be superimposed on the basis of the learning status assessed by the assessment unit 16 (ST93). In the example shown in FIGS. 3A, 3B, and 3C, an image of the tile 60 is generated as the image to be superimposed that indicates the learning status. The display of the tile 60 show the learning target region and the learning progress status indicating that the learning is being performed.

Next, the image signal generation unit 191 generates a display image signal in which the tile 60 that is the image to be superimposed is superimposed on the base image (ST94). The display image signal is the presentation signal for presenting the learning status to the user U.

As described above, in this embodiment, the image display can present the learning status of the robot 1 to the user U. The user U can intuitively know the learning status of the robot 1 with the sense of vision by viewing the image, and can know a growing state of the robot 1.

In addition, the user U can make an instruction of additional learning of the unlearned region or removal of the region that does not need to be learned by viewing the display image. Since the robot 1 can perform additional learning or removal of a region unnecessary for the object model in accordance with the instruction from the user, the object model can be efficiently optimized, and the performance in the object recognition can be efficiently improved. Moreover, since the additional learning or the like is performed in accordance with the instruction made by the user U, the user U can get simulated experience of training a real animal.

Second Embodiment

Next, a specific example of the display with the position and attitude of the robot 1 and the presentation of the learning status by the audio display will be described with reference to FIGS. 7A, 7B, 7C, and 8.

Figure 7C:
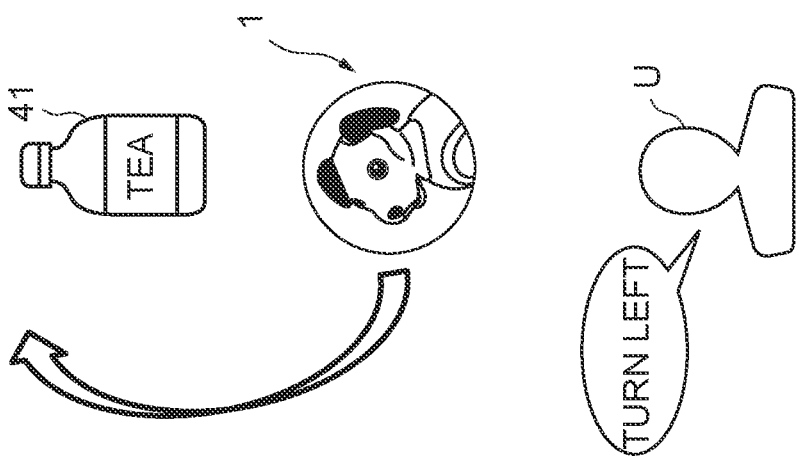
FIGS. 7A, 7B, and 7C The diagrams describing learning status presentation examples of audio display according to a second embodiment.
Figure 7B:
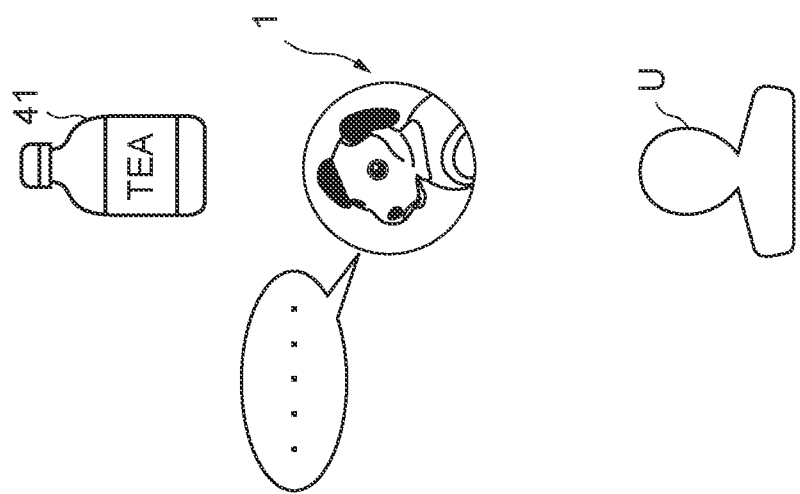
Figure 7A:
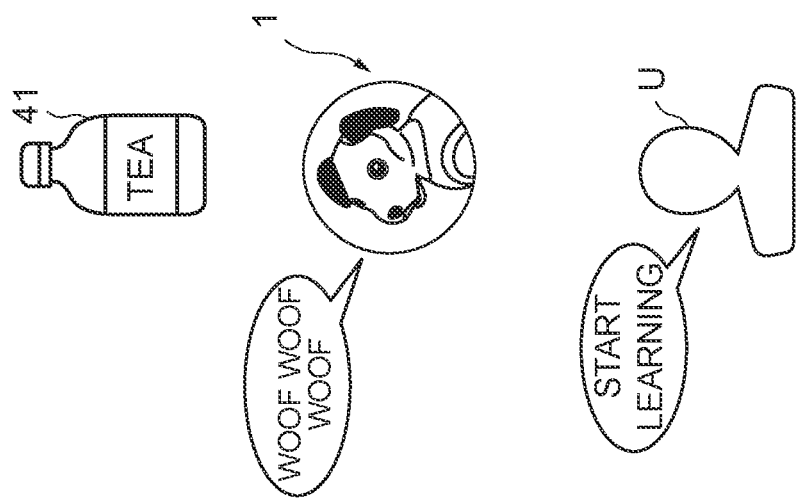

FIGS. 7A, 7B, and 7C are diagrams describing the display with the position and attitude of the robot 1 and the presentation of the learning status by the audio display. Here, the target of the object recognition learning is a tea PET bottle 41. FIG. 7A shows a state when the user U makes an instruction of the learning start and the robot 1 has not performed learning yet. FIG. 7B shows a state in which the robot 1 has already performed learning. FIG. 7C shows a state in which the user U makes an instruction of additional learning.

Figure 8:
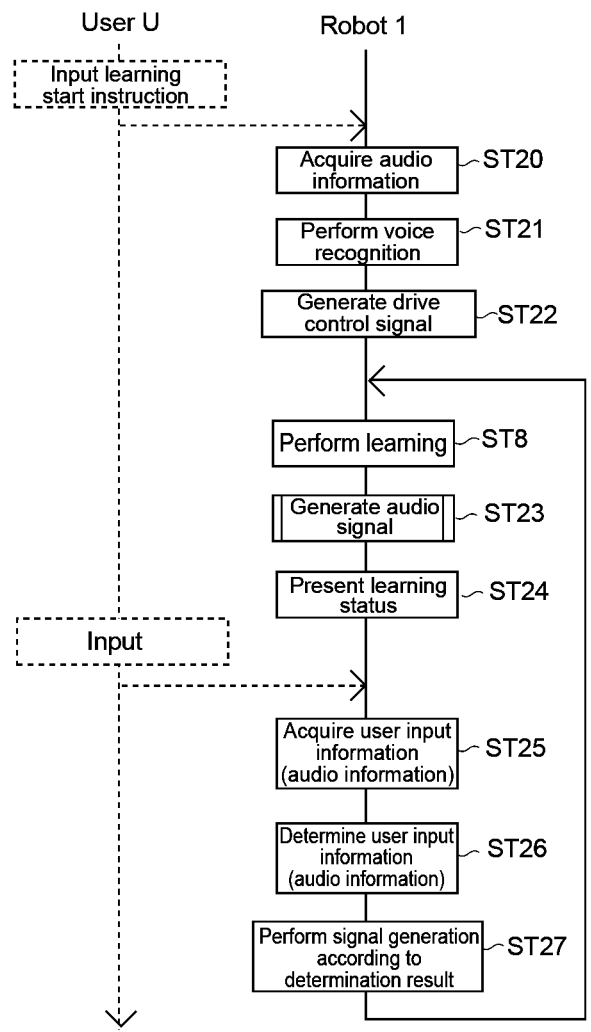
FIG. 8 A time flowchart showing a flow associated with learning status presentation according to the second embodiment.

FIG. 8 is a time flowchart showing a flow of a series of processing associated with the display with the position and attitude of the robot 1 and the presentation of the learning status by the audio display. The dotted-line portion in FIG. 8 indicates an operation performed by the user U and the solid-line portion in the figure indicates the processing performed by the robot 1.

Hereinafter, following the flow of FIG. 8, an information processing method associated with the display with the position and attitude of the robot 1 and the presentation of the learning status by the audio display will be described with reference to FIGS. 7A, 7B, and 7C.

It is assumed that the camera 2 of the robot 1 is constantly active and can acquire images.

The user U places the PET bottle 41 in the front of the robot 1 so that the PET bottle 41 that is the target of the object recognition learning is positioned in the range of the field of view of imaging of the camera 2 of the robot 1. In this state, by the user U uttering "learning start", an instruction input to start the object recognition learning of the PET bottle 41 is performed on the robot 1.

In the robot 1, the microphone 3 collects the voice uttered by the user U. This audio information is acquired by the user input information acquisition unit 17 as the user input information (ST20).

Next, the user input information determination unit 18 performs voice recognition processing of the acquired audio information (ST21) and determines whether or not the voice to make an instruction of the learning start has been uttered. Here, the description will be given assuming that the voice to make an instruction of the learning start has been uttered.

In a case where it is determined that the voice to make an instruction of the learning start has been uttered, the user input information determination unit 18 calculates the position and attitude information of the camera 2 at which an image of the PET bottle 41 that is suitable for the object recognition learning can be acquired. The position suitable for the object recognition learning is, for example, such a position that the entire PET bottle 41 is included in the field of view of imaging of the camera 2. It should be noted that in a case where the camera 2 is already at the position and attitude suitable for the object recognition learning, the position and attitude of the camera 2 are kept.

The control signal generation unit 192 generates drive control signals for the actuators 5 on the basis of the position and attitude information of the camera 2 that have been calculated by the user input information determination unit 18 (ST22).

By controlling the actuators 5 on the basis of the generated drive control signals, the position and attitude of the robot 1, thus the position and attitude of the camera 2, change.

A region of the PET bottle 41, which faces the robot 1, is the learning target region. The user U can know the region that the robot 1 considers as the learning target by viewing a positional relationship between the robot 1 and the PET bottle 4. In this manner, the learning target region is presented to the user U by the position and attitude of the robot. The drive control signals for the actuators 5 for controlling the position and attitude of the camera 2 is the presentation signal for presenting the learning target region to the user.

Next, the learning unit 20 starts the object recognition learning of the PET bottle 41 (ST8). This learning processing is similar to that of ST8 in the first embodiment, and therefore the description will be omitted.

Next, the audio signal generation unit 193 generates an audio signal indicating the learning progress status (ST23). The audio signal generation processing will be described later.

The audio signal to be generated is the presentation signal for presenting the learning progress status to the user and the loudspeaker 4 emits a sound based on the audio signal (S24). For example, the audio signal can be generated so that the robot 1 barks in a case where the learning has not been performed yet and does not bark in a case where the learning has already been performed.

In this manner, in this embodiment, the presentation of the learning progress status to the user, which is included in the learning status, is performed by the audio display. Moreover, the presentation of the learning target region to the user, which is included in the learning status, is performed by the display of the position and attitude of the robot 1 with respect to the learning target object.

As shown in FIG. 7A, when the PET bottle 41, which is an object unknown to the robot 1, is placed in the front and the learning start instruction is made by the user U, the robot 1 barks because it is unlearned. When the robot 1 performs learning and it is learned, the robot 1 does not bark as shown in FIG. 7B.

The user U can assess that the learning has already been performed by viewing the state in which the robot 1 stops barking. In a case where the user U wishes to perform additional learning of the PET bottle 41 from another viewpoint, the user U can instructs the robot 1 to move to a position for capturing an image of a region wished to be additionally learned by uttering the voice. In the example shown in FIG. 7, by the user U uttering "turn left", an instruction input of movement to the position for capturing the image of the region wished to be additionally learned is performed.

In the robot 1, the microphone 3 collects the voice uttered by the user U. This audio information is acquired by the user input information acquisition unit 17 as the user input information (ST25).

Next, the user input information determination unit 18 performs voice recognition processing of the acquired audio information (ST26) and determines whether or not the voice to make an instruction of the movement of the robot 1 has been uttered. This voice to make an instruction of the movement of the robot 1 is the feed-back information from the user U for specifying the region to be additionally learned. Here, the description will be given assuming that the voice to make an instruction of the movement of the robot 1, "turn left", has been uttered.

In a case where it is determined that the voice to make an instruction of the movement has been uttered, the user input information determination unit 18 calculates position and attitude information of the robot 1 so that the robot moves in accordance with the instruction indicated by the keyword uttered.

The control signal generation unit 192 generates drive control signals for the actuators 5 on the basis of the position and attitude information of the robot 1 calculated by the user input information determination unit 18 (ST27).

By controlling the actuators 5 on the basis of the generated drive control signals, as shown in FIG. 7C, the robot 1 moves to turn about the PET bottle 41 as the center from the left side of the PET bottle 41 as viewed from the robot 1. Since the robot 1 moves and the position and attitude change in this manner, the position and attitude of the camera 2 also change.

Next, returning to ST8, the processing is repeated and the object recognition learning of the PET bottle 41 from a different viewpoint position is performed. By repeating the processing in this manner, the object model is built and optimized.

The audio signal generation processing of the audio signal generation unit 193 in ST23 described above will be described with reference to FIG. 9.

Figure 9:
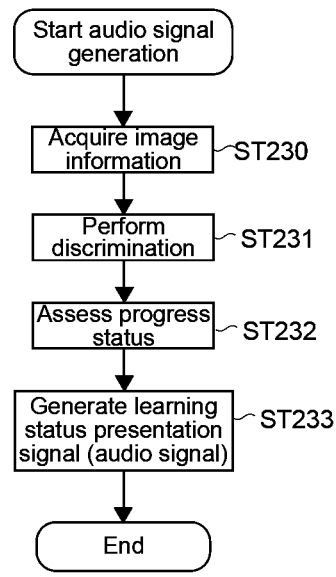
FIG. 9 A flowchart of audio signal generation processing.

As shown in FIG. 9, the image acquisition unit 11 acquires an image captured by the camera 2 (ST230).

Next, the discriminator unit 15 discriminates an object in the acquired image by using the object model stored in the object model storage unit 9 (ST231).

Next, the assessment unit 16 assesses an object recognition learning status on the basis of the discrimination result of the discriminator unit 15 (ST232). The assessment unit 16 assesses, as the learning status, information regarding a region that is a learning target and information regarding a learning progress status of the region. Here, an example in which the learning progress status is assessed with two values as to whether or not the learning has been performed.

Next, the audio signal generation unit 193 generates an audio signal indicating the learning progress status on the basis of the learning status assessed by the assessment unit 16 (ST233). In the examples shown in FIGS. 7A, 7B, and 7C, an audio signal imitating a bark of a dog is generated as the audio signal indicating the learning progress status. For example, it barks "WOOF WOOF WOOF" in a case where the learning has not been performed yet, and it does not bark in a case where the learning has already been performed. It should be noted that a case where the learning has not been performed at all and a case where the learning is being performed may be expressed with different barks (sounds). For example, the bark (sound) can be changed using the sound volume, the frequency of barking, or the like.

In this manner, in this embodiment, the learning status can be presented to the user by using the audio display that is one of communication means provided in the robot 1.

Hereinabove, the example in which in a case where the user makes an instruction of the learning start and the robot 1 is on the learning mode, the instruction of the movement from the user is input and the actuators are driven in accordance with that instruction, and then the learning is performed has been described, though not limited thereto. After the user's instruction of the movement, a configuration in which learning after the position and attitude change is performed in accordance with an instruction by the utterance "learning start" may be employed.

The learning mode may be switched to the normal mode by the user's utterance "learning end". The keyword indicating that learning end may be registered in advance and the presence/absence of the utterance from the user, which indicates the learning end, may be assessed by voice recognition with the registered keyword.

Although the example in which the robot 1 is moved and additional learning is performed by the utterance to instruct the robot 1 to move has been described above, a configuration in which in a case where the user wishes to perform the learning in a focused manner with respect to the learning target region that has already been learned, additional learning of that region is performed by the utterance, e.g., "look carefully" may be employed.

For example, a case where the robot 1 is located facing the PET bottle 41 so as to face a side of the label on which the text "TEA" is described, the learning is done, and the bark is stopped will be assumed. The user can perform additional learning by uttering "look carefully" in a case where the user wishes to perform the learning of the label of the PET bottle on which "TEA" is described in a focused manner. The keyword for triggering such additional learning processing may be registered in advance and the presence/absence of the utterance from the user, which indicates the additional learning, may be assessed by voice recognition with the registered keyword.

Moreover, in a case where the user wishes to exclude the learning in the target region already learned by the robot 1, the user may utter "forget" or the like. Accordingly, the robot 1 removes a region set as an object recognition target when the utterance is done, from the object model. The keyword indicating such removal processing may be registered in advance and the presence/absence of the utterance from the user, which indicates the removal, may be assessed by voice recognition with the registered keyword.

As described above, in this embodiment, the learning status of the robot 1 can be presented to the user U by the display with the position and attitude of the robot 1 and the audio display emitted from the robot 1. The user U can intuitively know the learning status of the robot 1 by viewing the behavior of the robot 1 and know a growing state of the robot 1.

In addition, since the user U can make the instruction of additional learning of the unlearned region and the robot 1 can move and learn in accordance with that instruction, the object model can be efficiently optimized. Moreover, since the user U can give an instruction associated with the learning to the robot 1 by the voice instruction, the user U can get simulated experience of training a real animal.

Third Embodiment

Next, another image example showing a learning status displayed on the user terminal 30 will be described with reference to FIG. 10.

Figure 10:
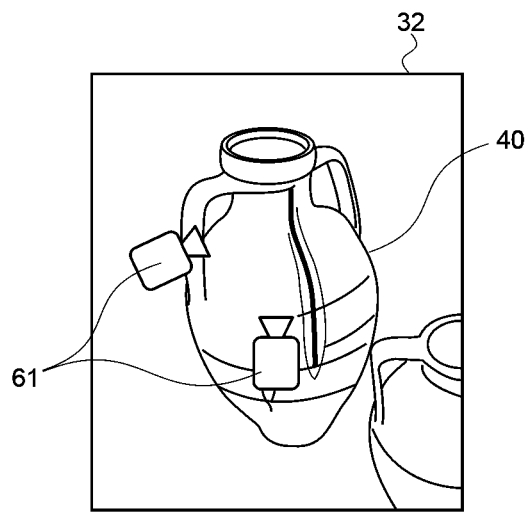
FIG. 10 A diagram for describing a learning status presentation example by image display according to a third embodiment, which is an image example displayed on the user terminal.

Although in the first embodiment, the learning status is displayed as tiles, icons 61 may be used for displaying the learning status as shown in FIG. 10. In FIG. 10, the icons 61 are camera icons imitating viewpoint information. It should be noted that the shape of the icon can be various shapes such as a robot shape.

In a case where the object model includes three-dimensional information and viewpoints learned at the time of learning have been recorded, the image signal generation unit 191 may generate the icons 61 showing the learned viewpoints in accordance with the attitude of an object currently shown in the image as images to be superimposed by using the learned viewpoint information of the object model in addition to an assessment result of the assessment unit 16. The positions of the icons 61 having the camera shapes on the image and the orientations of the cameras indicate regions that the robot 1 has set as learning targets with respect to the pot 40 and also indicates that those regions have been learned.

In this manner, a display image indicating the learning status may be generated by superimposing the icons 61 as the images to be superimposed on the pot 40 in the base image. It should be noted that the already learned region and the currently learned region may be distinguished and expressed by changing the colors of the icons 61 or differentiating the display method, e.g., blinking, and the same applies to the tile display according to the first embodiment and voxel display according to a sixth embodiment to be described later.

Also in this embodiment, as in the first embodiment, an input button for learning start is displayed in the base image acquired by the camera 2 by activation of the application, an input operation is performed through the input button, and the learning is thus started.

Moreover, as in the first embodiment, the input buttons for additional learning and removal may be displayed in the image on which the icons 61 are superimposed. The user taps an arbitrary part of the display unit 32 and taps the input button for additional learning or removal. In this manner, the additional learning or removal of the region tapped by the user is performed.

Fourth Embodiment

Next, another image display example showing the learning status displayed on the user terminal 30 will be described with reference to FIG. 11.

Figure 11:
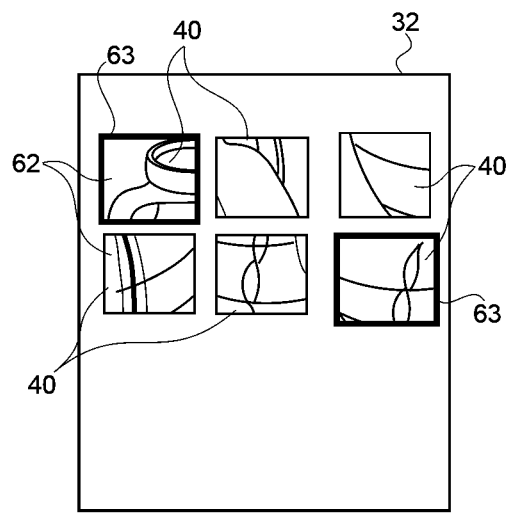
FIG. 11 A diagram for describing a learning status presentation example by image display according to a fourth embodiment, which is an image example displayed on the user terminal.

As shown in FIG. 11, the images may be displayed as thumbnails. For example, divided images of an image acquired by the camera 2 may be displayed as thumbnails and frames 63 may be used as images to be superimposed that indicate the learning statuses. The frames 63 have shapes surrounding thumbnail images 62, and in a case where regions represented by the thumbnail images 62 have been already learned, they are displayed with the frames 63 superimposed to surround those thumbnail images. On the other hand, the regions represented by the thumbnail images 62 not surrounded with the frames 63 indicate that the learning has not been performed. Owing to such image display, the user U can know the region that is set as the learning target and the learning status in that region.

Also in this embodiment, as in the first embodiment, the input button for learning start is displayed in the base image acquired by the camera 2 by activation of the application, an input operation is performed through the input button, and the learning is thus started.

Moreover, as in the first embodiment, the input buttons for additional learning and removal may be displayed in the images displayed as thumbnails. The user taps an arbitrary thumbnail image and taps the input button for additional learning or removal. In this manner, the additional learning or removal of the thumbnail image tapped by the user is performed.

Moreover, the fact that the learning is currently performed may be presented to the user U by using the thumbnail display. For example, an image of an object region estimated and detected by the robot 1 is divided and displayed as thumbnails. The frame 63 is not superimposed on the thumbnail image 62 currently learned and the frame 63 is superimposed and displayed on the thumbnail image 62 already learned. Accordingly, the user U can know the progress status of the learning.

Fifth Embodiment

Next, another image display example of the learning status displayed on the user terminal 30 will be described with reference to FIG. 12.

Figure 12:
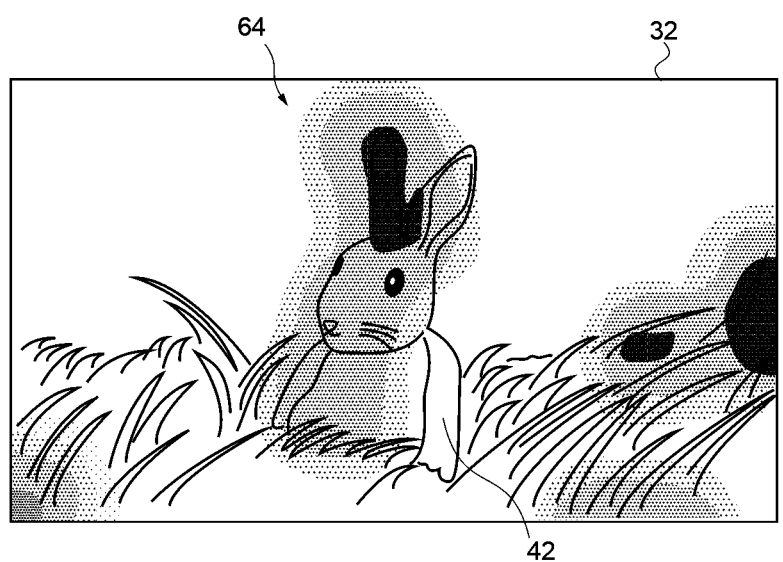
FIG. 12 A diagram for describing a learning status presentation example by image display according to a fifth embodiment, which is an image example displayed on the user terminal.

As shown in FIG. 12, the learning status may be displayed as a heat map. The heat map is map information in which the positions of learning target region in an image are associated with learning progress statuses and is displayed by using color differences including color progression.

Moreover, although the example in which the learning progress status is represented with two values as to whether or not the learning has been performed has been described in each of the first to fourth embodiments above, three or more values may be adopted. In this embodiment, although an example in which the learning progress status is displayed as a heat map with four values will be described, the learning progress status may be displayed as a heat map with two values. Here, an example in which the image to be superimposed is generated so that a region that is set as a learning target can be identified by color and a region that is not set as a learning target is not colored will be described. An example in which the heat map of the image to be superimposed is represented with three different colors depending on the learning progress statuses will be described.

In FIG. 12, differences in color of a heat map 64 are displayed using dots. The figure indicates that as the dot density becomes higher, the learning has been more sufficiently performed. Here, it is assumed that a part having the highest dot density indicates red, a part having the second highest dot density indicates green, and a part having the lowest dot density indicates blue. It should be noted that the colors used for the heat map display are not limited to the colors set forth herein. The user can intuitively know the learning progress status by the heat map display.

In this embodiment, the assessment unit 16 assesses a learning status by using a score that is the discrimination result output by the discriminator unit 15. The color display of the heat map indicating the learning progress status is assessed on the basis of the assessment result.

The assessment unit 16 assesses the learning progress status on the basis of a score calculated by the discriminator unit 15.

For example, in a case where the score is larger than 0.5, the assessment unit 16 assesses that the learning has been sufficiently performed. The assessment unit 16 sends to the image signal generation unit 191 position information of the region whose score is larger than 0.5 and color information showing that region in red in the image to be superimposed.

In a case where the score is 0.3 or more and 0.5 or less, the assessment unit 16 assesses that the learning progress status is a middle level. The assessment unit 16 sends to the image signal generation unit 191 position information of the region whose score is 0.3 or more and 0.5 or less and color information showing that region in green in the image to be superimposed.

The assessment unit 16 assesses that the learning is insufficient in a case where the score is 0 or more and less than 0.3. The assessment unit 16 sends to the image signal generation unit 191 position information of a region whose score is 0 or more and less than 0.3 and color information showing that region in blue in the image to be superimposed.

The image signal generation unit 191 generates the image to be superimposed on the basis of information sent from the assessment unit 16, and the image to be superimposed is superimposed on the base image, and the display image displayed on the display unit 32 is generated. In the example shown in FIG. 12, the heat map 64 indicating the learning status is superimposed as the image to be superimposed on a base image of a rabbit 42 that is an object recognition target. In the example shown in FIG. 12, the periphery of the right ear of the rabbit 42 displayed in red, a green region is arranged to surround the red portion, and a blue region is further arranged to surround the green region. In this manner, the heat map 64 visualizing the data of the learning progress statuses is differently colored and displayed in accordance with the scores.

As described above, the learning progress status may be represented with three or more values, and a heat map quantizing several thresholds may be generated using the scores. Here, although an example in which the learning progress status is colored and displayed by quantizing sequential values of the scores has been described, the sequential values may be represented by color progression or the like for example.

It should be noted that although the example of the image display has been described in this embodiment, the learning progress status can be presented with three or more values also in a case where the learning progress statuses are presented by the audio display as in the above-mentioned second embodiment.

Specifically, the sound volume of the sound emitted from the robot 1, the voice length, and the frequency of audio generation can be changed on the basis of the assessment of the learning progress statuses based on the scores calculated by the discriminator unit 15, which has been made in the assessment unit 16. For example, an audio signal may be generated so that the bark becomes smaller as the learning progresses or an audio signal may be generated so that barking is performed at the beginning of the learning but barking gradually stops as the learning progresses. In this manner, also in the audio display, the learning progress statuses can be displayed with three or more values.

Also in this embodiment, as in the first embodiment, the input button for learning start is displayed in the base image acquired by the camera 2 by activation of the application, an input operation is performed through the input button, and the learning is thus started.

Moreover, as in the first embodiment, the input buttons for additional learning and removal may be displayed in the image on which the heat map 64 is superimposed. The user taps an arbitrary part of the display unit 32 and taps the input button for additional learning or removal. In this manner, the additional learning or removal of the region tapped by the user is performed. When an arbitrary part in the region in which the heat map 64 is superimposed is tapped, a region continuous with and having the same color as the tapped part may be set as an additional learning or removal target.

Sixth Embodiment

Next, another display example of the learning status displayed on the user terminal 30 will be described with reference to FIG. 13.

Figure 13:
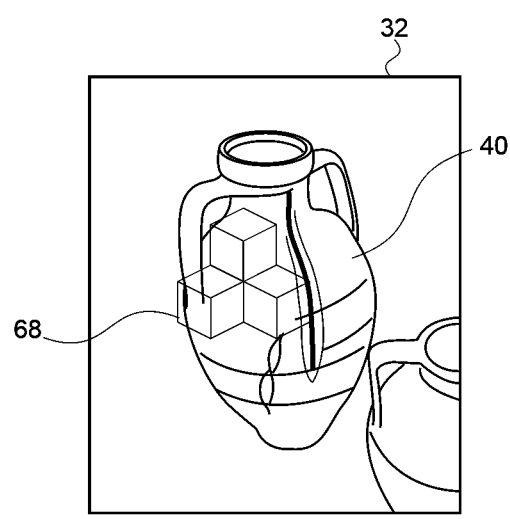
FIG. 13 A diagram for describing a learning status presentation example by image display according to a sixth embodiment, which is an image example displayed on the user terminal.

In a case where the object model includes three-dimensional information, the image signal generation unit 191 may generate three-dimensional voxels 68 as images to be superimposed as shown in FIG. 13 by using the estimated position and attitude of the object in addition to the assessment result of the assessment unit 16. In this manner, the learning status may be displayed by using the three-dimensional voxels 68.

As described above, in the present technology, the object recognition learning status is configured to be capable of being presented to the user by the image, the position and attitude of the robot, the sound emitted from the robot, or the like. Accordingly, the user can intuitively know the learning status by the sense of vision, the sense of hearing, or the like. The user can feel a real interaction with the robot.

OTHER EMBODIMENTS

Embodiments of the present technology are not limited only to the above-mentioned embodiments and various changes can be made without departing from the gist of the present technology.

For example, in a case where the object model includes three-dimensional information and the robot 1 has performed learning for each viewpoint or region, the number of times of repeated learning, the degree of decrease of the cost value, and the like for each viewpoint or region may be superimposed and displayed as the heat map or the like for the learning status. The heat map display of the number of times of repeated learning, the degree of decrease of the cost value, or the like may be displayed with a color axis different from that of the heat map display indicating the learning progress status according to the fifth embodiment. Moreover, the number of times of repeated learning or the degree of decrease of the cost value may be represented by differentiating the transmittance of the color of the heat map showing the learning progress status according to the fifth embodiment.

Moreover, as another image display example of the learning status presentation, the unlearned region may be displayed in a blurred state or the image displayed in a rough state, for example. Moreover, as the image to be superimposed that indicates the learning progress status, the image or the like describing the score information as a text may be used. Moreover, the already learned region may be displayed with an outline.

Moreover, as another image display example, an image region as to which it is difficult to discriminate whether or not it may be set as the object region in the object region detection unit 12 may be visualized and displayed in a user-recognizable manner. The user U may instruct whether or not to learn the image region for which it is difficult for the robot 1 to discriminate by viewing this image. Efficient learning can be performed by the robot 1 performing the learning on the basis of the type of the instruction.

Moreover, in the above-mentioned embodiments, the example in which the position and attitude of the camera are changed by the input operation through the touch panel 35 or the voice input has been described, though not limited thereto. For example, the position and attitude of the camera 2 may be changed by the user U directly moving the limbs of the robot 1.

Moreover, in the above-mentioned embodiments, the examples of the input through the touch panel 35 and the voice input have been described as the input operation from the user, though not limited thereto.

The input operation may be input by a characteristic gesture performed by the user. The gesture of the user can be recognized on the basis of the image captured by the camera 2 or the rear camera. For example, in a case where the user U is located behind the robot 1, the gesture of the user can be recognized on the basis of the image captured by the rear camera of the robot 1. It should be noted that in order to increase the accuracy of object recognition learning, it is favorable that the camera that captures images for performing the gesture recognition of the user U is different from the camera that captures images of the object that is the target of the object recognition learning.

For example, the characteristic gesture performed by the user may be the trigger of the learning start. The gesture that is the trigger may be determined in advance, and the learning may be started by the user input information determination unit 18 recognizing the gesture by using the image captured by the camera 2, considering that the input operation of the learning start from the user has been made.

Moreover, the behavior instruction of the robot 1 by the user may be performed by the gesture. For example, a configuration in which the robot 1 takes a behavior of moving left by a gesture in which the user stretches the left hand from the middle of the chest to the left side straightly in the horizontal direction may be employed.

Such a gesture is registered in advance.

Moreover, for example, the example in which the learning is started using the keyword as the trigger in the instruction of the learning start by the voice input has been described, though not limited thereto. For example, a sound of clapping hands, a sound of an instrument such as a whistle, a music piece, or the like may be configured to be the trigger of the learning start.

Moreover, the trigger of the learning start is not limited to the input operation from the user U. In a case where the robot 1 has recognized that it is an unknown object other than the previously stored objects by image recognition, the learning with respect to the unknown object may be started.

Moreover, a configuration in which the learning is started by taking particular position and attitude, for example, by the user U placing the object that is the learning target on one of the front legs of the robot 1 may be employed. In this case, driving signals for the actuators 5 of the robot 1 may be generated so that the robot 1 transfers the held object to the other leg on the basis of the input from the user U through the touch panel 35 or the voice input. Since transferring the object to the other leg changes the viewpoint of the camera with respect to the object, the object can be imaged from a different viewpoint.

Moreover, the robot 1 and the object may be arranged so that the object that is the learning target and a known object are positioned in the field of view of imaging of the camera 2. Accordingly, the robot 1 estimate the scale of the learning target object by using the known object. The known object is an object stored in the robot 1 in advance, and for example, is a toy such as a ball dedicated to the robot.

Moreover, in the first embodiment, the example in which the learning status is presented by the image display and the instruction to the robot 1 is made by the input operation through the touch panel 35 on which the image is displayed has been described. In the second embodiment, the example in which the learning status is presented by the display with the position and attitude of the robot 1 and the audio display and the instruction to the robot 1 is made by the voice of the user U has been described. They may be combined, and for example, the user U who has confirmed the learning status by the image display may instruct the robot 1 by the voice.

Moreover, although in the above-mentioned embodiments, the example in which the information processing unit 10 that performs the series of processes of generating the presentation signal is provided in the robot 1 has been described, the information processing unit 10 may be provided in an external device other than the robot 1, such as the server and the user terminal 30. In this case, the external device including the information processing unit 10 is the information processing apparatus. Moreover, some functions of the information processing unit 10 may be provided in the external device other than the robot 1. For example, the image signal generation unit 191 may be provided on the side of the user terminal 30.

Moreover, in the above-mentioned embodiments, the four-legged pet robot has been described as the example of the robot, though not limited thereto. The example of the robot may include walking on two legs, walking on multiple legs that are two or more legs, or another movement means.

Moreover, in the above-mentioned embodiment, the example in which the position and attitude of the robot 1 are controlled on the basis of the input information regarding the region to be additionally learned from the user, though not limited thereto. For example, in a case where a camera capable of optical zoom is used, a camera control signal for controlling an optical mechanism of the camera may be generated on the basis of the input information regarding the region to be additionally learned.

It should be noted that the present technology may also take the following configurations.

(1) An information processing apparatus, including:
  a learning unit that performs recognition learning of an object in an image captured by a camera;
  an assessment unit that assesses a progress status of the recognition learning of a target region of the object; and
  a signal generation unit that generates a presentation signal for presenting the target region and the progress status to a user.

(2) The information processing apparatus according to (1), in which
  the signal generation unit generates an image signal for visualizing the target region and the progress status as the presentation signal.

(3) The information processing apparatus according to (2), in which the signal generation unit generates an image signal in which an image to be superimposed for representing the target region and the progress status is superimposed on the image captured by the camera.

(4) The information processing apparatus according to (3), in which
the image to be superimposed is an image represented using at least one of a heat map, a tile, a voxel, a text, or an icon.

(5) The information processing apparatus according to (2), in which
the signal generation unit generates an image signal in which an image to be superimposed for representing the progress status of the recognition learning is superimposed on a thumbnail image obtained by dividing the image.

(6) The information processing apparatus according to any one of (1) to (5), in which
the signal generation unit generates an audio signal for representing the progress status as the presentation signal.

(7) The information processing apparatus according to any one of (1) to (6), in which
the signal generation unit generates a control signal for controlling position and attitude of a mobile object on which the camera is mounted, as the presentation signal, and
the target region is presented to the user by a positional relationship between the mobile object and the object.

(8) The information processing apparatus according to any one of (1) to (7), further including
a discriminator unit that discriminates an object in the image by using an object model generated by the learning unit, in which
the assessment unit assesses the progress status by using a discrimination result of the discriminator unit, and
the signal generation unit generates the presentation signal by using an assessment result of the assessment unit.

(9) The information processing apparatus according to any one of (1) to (8), further including
an input information acquisition unit that acquires information input by the user with respect to presentation content based on the presentation signal.

(10) The information processing apparatus according to (9), in which
the learning unit performs object recognition learning on the basis of the input information.

(11) The information processing apparatus according to (9), in which
the signal generation unit controls position and attitude of the camera on the basis of the input information.

(12) The information processing apparatus according to (9), further including
a model modification unit that modifies, on the basis of the input information, an object model generated by the learning unit.

(13) The information processing apparatus according to any one of (1) to (12), in which
the camera is mounted on a mobile object having a mobile portion.

(14) An information processing method, including:
performing recognition learning of an object in an image captured by a camera;
assessing a progress status of recognition learning of a target region of the object; and
generating a presentation signal for presenting the target region and the progress status to a user.

(15) A program that causes an information processing apparatus to execute:
a step of performing recognition learning of an object in an image captured by a camera;
a step of assessing a progress status of recognition learning of a target region of the object; and
a step of generating a presentation signal for presenting the target region and the progress status to a user.

REFERENCE SIGNS LIST 1 robot (information processing apparatus)
2 camera
15 discriminator unit
16 assessment unit
17 user input information acquisition unit (input information acquisition unit)
19 signal generation unit
20 learning unit
21 model modification unit
32 display unit
40 pot (object)
41 PET bottle (object)
42 rabbit (object)
60 tile (image to be superimposed)
61 icon (image to be superimposed)
62 thumbnail image
63 frame (image to be superimposed)
68 voxel (image to be superimposed)
U user

The invention claimed is:
1. An information processing apparatus, comprising:
a camera configured to capture a first image; and
a memory device having stored thereon, computer executable instructions, which when executed by the information processing apparatus, cause the information processing apparatus to:
execute a recognition learning process of an object in the first image captured by the camera;
detect from the first image an object region in which the object is present;
extract feature amounts of feature points associated with the object region;
create an object model based on the extracted feature amounts;
discriminate the object in the first image based on the object model;
assess a progress status of the recognition learning process of a target region of the object based on a discrimination result;
generate an image signal, in which a second image that represents the target region and the progress status is superimposed on the first image captured by the camera, as a presentation signal for presenting to present the target region and the progress status to a user; and
output the image signal to a display device to present the target region and the progress status to the user.

2. The information processing apparatus according to claim 1, wherein the second image that is superimposed is an image represented by at least one of a heat map, a tile, a voxel, a text, or an icon.

3. The information processing apparatus according to claim 1, wherein the computer executable instructions further cause the information processing device to generate the image signal in which the second image that represents the progress status of the recognition learning process is superimposed on a thumbnail image, and the thumbnail image is obtained based on division of the first image.

4. The information processing apparatus according to claim 1, wherein the unit computer executable instructions further cause the information processing device to generate an audio signal to represent the progress status as the presentation signal.

5. The information processing apparatus according to claim 1, wherein the computer executable instructions further cause the information processing device to generate a control signal to control position and attitude of a mobile object on which the camera is mounted, as the presentation signal, and the target region is presented to the user based on a positional relationship between the mobile object and the object.

6. The information processing apparatus according to claim 1, wherein the computer executable instructions further cause the information processing device to generate the presentation signal based on the assessed progress status.

7. The information processing apparatus according to claim 1, wherein the computer executable instructions further cause the information processing device to acquire user input information with respect to presentation content based on the presentation signal.

8. The information processing apparatus according to claim 7, wherein the computer executable instructions further cause the information processing device to execute an object recognition learning operation based on the user input information.

9. The information processing apparatus according to claim 7, wherein the computer executable instructions further cause the information processing device to control position and attitude of the camera based on the user input information.

10. The information processing apparatus according to claim 7, the computer executable instructions further cause the information processing device to modify, based on the user input information, the object model.

11. The information processing apparatus according to claim 1, wherein the camera is mounted on a mobile object, and the mobile object includes a mobile portion.

12. The information processing apparatus according to claim 1, wherein the computer executable instructions further cause the information processing device to remove a learned region from the object model based on a user input.

13. An information processing method, comprising:

in an information processing device including a camera;

executing a recognition learning process of an object in a first image captured by the camera;

detecting from the first image an object region in which the object is present;

extracting feature amounts of feature points associated with the object region;

creating an object model based on the extracted feature amounts;

discriminating the object in the first image based on the object model;

assessing a progress status of the recognition learning process of a target region of the object based on a discrimination result;

generating an image signal, in which a second image that represents the target region and the progress status is superimposed on the first image captured by the camera, as a presentation signal for presenting the target region and the progress status to a user; and outputting the image signal to a display device to present the target region and the progress status to the user.

14. A non-transitory computer-readable medium having stored thereon, computer executable instructions, which when executed by a computer, cause the computer to execute operations, the operations comprising:

executing a recognition learning process of an object in a first image captured by a camera;

detecting from the first image an object region in which the object is present;

extracting feature amounts of feature points associated with the object region;

creating an object model based on the extracted feature amounts;

discriminating the object in the first image based on the object model;

assessing a progress status of recognition learning process of a target region of the object based on a discrimination result;

generating an image signal, in which a second image that represents the target region and the progress status is superimposed on the first image captured by the camera, as a presentation signal for presenting the target region and the progress status to a user; and outputting the image signal to a display device to present the target region and the progress status to the user.

\* \* \* \* \*